United States Patent [19]
Lee

[11] Patent Number: 6,143,169
[45] Date of Patent: Nov. 7, 2000

[54] SUMP ARRANGEMENT WITH BAFFLING

[75] Inventor: Brian Thomas Lee, Charlotte, N.C.

[73] Assignee: Dana Corporation, Toledo, Ohio

[21] Appl. No.: 09/378,710

[22] Filed: Aug. 23, 1999

[51] Int. Cl.[7] .............................. B01D 29/05; F01M 11/06
[52] U.S. Cl. .................... 210/168; 210/416.5; 210/460; 210/474; 210/483; 210/493.5; 123/196 A; 184/6.24
[58] Field of Search ...................... 210/167, 168, 210/416.5, 435, 445, 455, 460, 474, 473, 477, 483, 493.1, 493.5; 123/196 A; 184/6.21, 6.24; 137/386

[56] References Cited

U.S. PATENT DOCUMENTS

| | | |
|---|---|---|
| 1,230,470 | 6/1917 | Farmer . |
| 1,286,345 | 12/1918 | Kirkham . |
| 1,305,355 | 6/1919 | Gulick . |
| 1,630,876 | 5/1927 | Watson . |
| 1,761,930 | 6/1930 | McCuen . |
| 1,802,847 | 4/1931 | Stolte . |
| 1,862,995 | 6/1932 | Anibal . |
| 2,767,736 | 10/1956 | Lackinger . |
| 3,056,501 | 10/1962 | Thorman et al. . |
| 3,707,202 | 12/1972 | Dixon . |
| 4,126,557 | 11/1978 | Hodgkins . |
| 4,352,737 | 10/1982 | Taniguchi . |
| 4,354,521 | 10/1982 | Harde . |
| 4,449,493 | 5/1984 | Kopec et al. . |
| 4,828,694 | 5/1989 | Leason . |
| 4,995,971 | 2/1991 | Droste et al. . |
| 5,653,205 | 8/1997 | Ozeki . |
| 5,863,424 | 1/1999 | Lee . |

*Primary Examiner*—David A. Simmons
*Assistant Examiner*—Fred Prince
*Attorney, Agent, or Firm*—Millen, White, Zelano & Branigan

[57] ABSTRACT

Oil sump arrangements, such as transmission oil sumps and lubricating oil sumps used with the drive train of automotive vehicles are divided into an upper chamber and a lower chamber with a filter media disposed between the upper chamber and the lower chamber. The oil being circulated to a transmission or an engine pools in the lower chamber and is sucked by a suction tube out of the lower chamber for recirculation. In order to prevent the oil from pooling or accumulating under centrifugal force away from the suction tube so that air is ingested by the suction tube and the transmission or engine momentarily starved for oil, a plurality of baffle plates are placed in the lower chamber and extended parallel to the longitudinal axis of the vehicle which is the normal direction of motion of the vehicle. The baffle plates obstruct movement of the oil away from the suction tube inlet. In addition, the filter media is preferably a pleated filter media with the pleats extending parallel to the extent of the baffle plates so that the filter media also discourages lateral movement of the oil away from the suction tube inlet.

15 Claims, 3 Drawing Sheets

SUMP ARRANGEMENT WITH BAFFLING

SUMMARY OF THE INVENTION

The present invention is directed to a sump arrangement with baffling. More particularly, the present invention is directed to a sump arrangement with baffling for use in drive trains of vehicles to prevent liquids such as transmission oil and lubricating oil from shifting within a sump away from the circulating system so as to starve the engine of the liquid.

BACKGROUND OF THE INVENTION

In automotive vehicles equipped with automatic transmissions, transmission oil is pooled in a sump located beneath the transmission and pumped to circulate through the transmission. If the vehicle is accelerated abruptly in one direction by cornering the vehicle hard, or by either accelerating the vehicle rapidly or braking the vehicle hard, transmission oil in the sump can shift completely away from a suction inlet before a circulation system of the automatic transmission which starves the system for transmission oil and causes the system to suck air. This adversely affects the responsiveness of the vehicle, as well as potentially damaging the automatic transmission.

This phenomenon can also be a problem with lubricating oil pans where accelerations due to rapidly changing direction can pull lubricating oil away from oil suction tubes.

This problem is exacerbated by engines which are mounted transverse to the normal direction of vehicle travel because the pans tend to be elongated in the transverse direction due to the structure of engine blocks in transmissions. While this phenomenon is a problem in land vehicles, it may also be a problem in boats, aircraft, construction machinery, and other devices and conveyances which move and change direction.

FIGS. 3 and 4 illustrate the difficulties of the prior art, with FIG. 3 showing liquid level at a suction tube inlet when a vehicle is traveling substantially in a straight line, while FIG. 4 illustrates what can happen to the level of liquid at the suction tube inlet when the vehicle is abruptly cornered.

In view of the aforementioned considerations, it is a feature of the present invention to provide a new and improved arrangement for sumps wherein liquid within the sumps is prevented from shifting away from the inlets of circulating systems due to acceleration of machinery with which the sumps are used.

In view of this feature, and other features, the present invention is directed to a sump arrangements for liquids circulating in a drive train of a vehicle wherein the sump arrangement comprises a sump pan having side walls and a horizontally extending floor. The sump pans includes a suction tube for returning liquid pooling on the floor of the sump to the drive train. A panel is disposed in the sump pan in spaced relation to the floor to divide the sump pan into a first chamber and a second chamber, the panel having an opening there through for connecting the two chambers and a panel extending transverse to the direction of the vehicle travel. A filter media is disposed in the opening so that liquid in the first chamber flows through the filter and pools in the second chamber for return to the drive train by the suction tube. A plurality of baffles are disposed in the second chamber to prevent rapid movement of the liquid toward the lateral sides of the sump pan whereby the suction tube retains a sufficient supply of liquid to continuously pump liquid to the drive train when acceleration forces tend to move the liquid away from the suction tube.

In a more specific aspect of the invention, the baffles are in the form of plates wherein the plates have openings adjacent thereto or therethrough, which allow normal flow of fluid past the baffles but discourage rapid lateral movement of the liquid in the sump away from the suction tube.

In a more specific aspect of the invention, the sump is defined by a transmission oil pan, and in still another aspect of the invention, the sump is defined by a lubricating oil pan.

DETAILED DESCRIPTION

Figure 1:
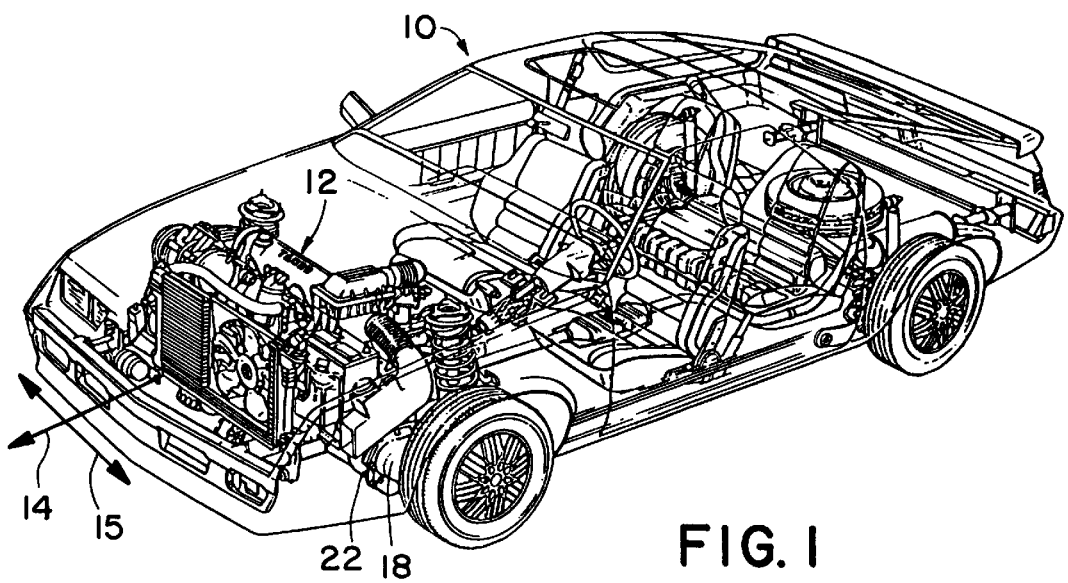
FIG. 1 is a perspective view of a vehicle having a drive train, which drive train includes sump arrangements for liquid, the sump arrangements being configured in accordance with the principles of the present invention.

Referring now to FIG. 1, there is shown a front wheel drive vehicle 10 having an engine 12 mounted with its drive shaft in a transaxial arrangement extending in a transverse direction to the normal direction of travel 14 of the vehicle. When the vehicle 10 corners, lateral forces 15 are exerted on the engine 12.

Figure 2:
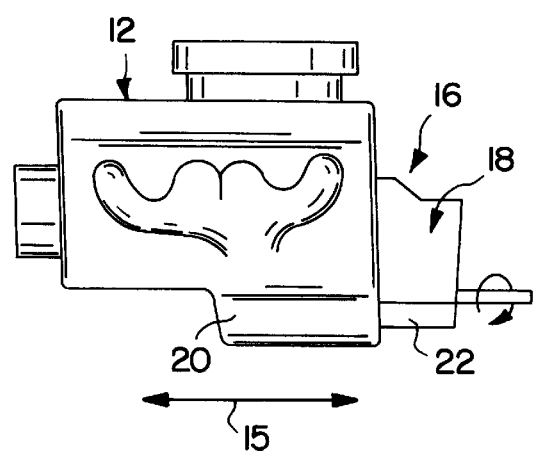
FIG. 2 is a front view of the engine of the vehicle of FIG. 1.

Referring now to FIG. 2, there is shown a front view of the vehicle of FIG. 1 with the engine 12 shown schematically as part of a drive train 16 which includes an automatic transmission 18. Typically, the engine 12 includes a lubricating oil pan 20 while the transmission 18 includes a transmission oil pan 22.

Figure 3:
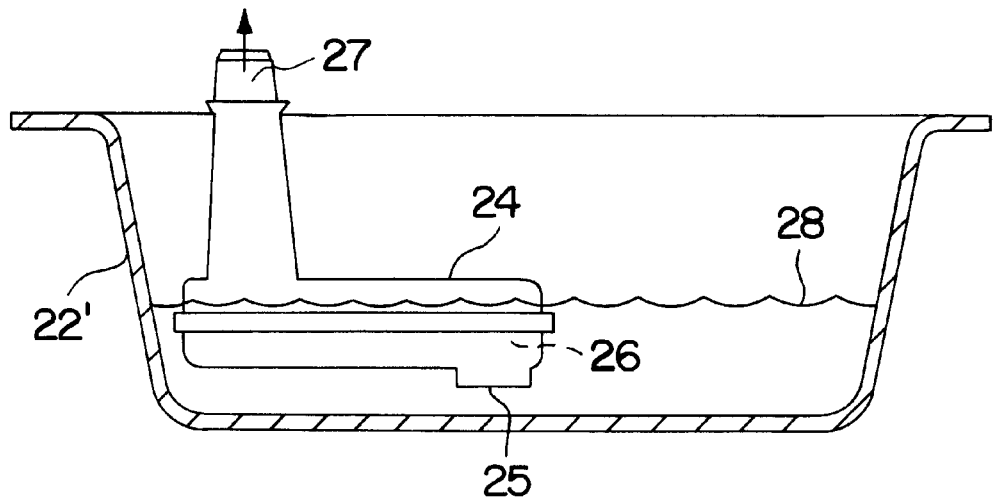
FIG. 3 is a front elevational view of a prior art sump arrangement adapted to be mounted on a vehicle.
Figure 4:
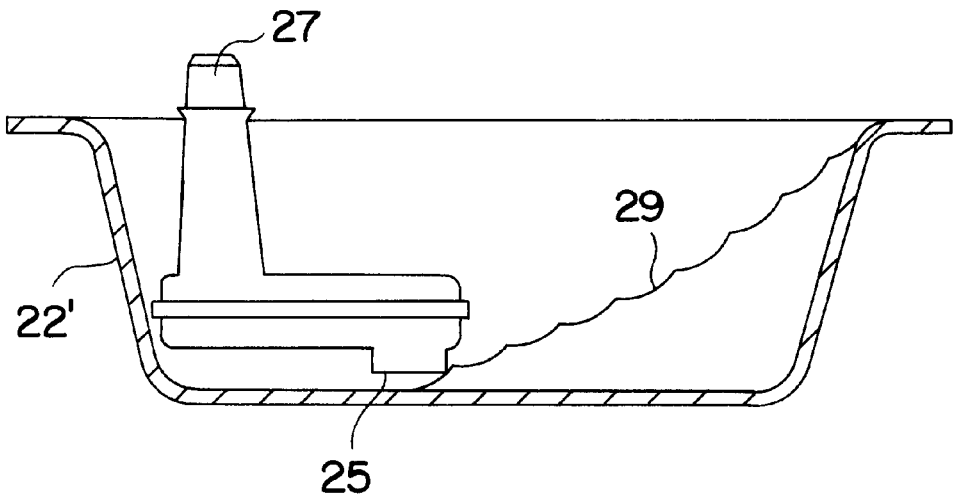
FIG. 4 is a front elevational view of the sump arrangement of FIG. 3, showing oil laterally displaced due to the vehicle cornering.

Referring now to FIGS. 3 and 4, there is shown a transmission oil pan 22' of the prior art. Disposed within the transmission oil pan 22' is a suction tube filter combination 24 which includes an inlet 25, a filter element 26 and an outlet 27 which is connected to a pump (not shown). Under straight line driving conditions with gentle cornering, when the vehicle 10 of FIGS. 1 and 2 is moving in the direction of the arrow 14, transmission oil is at the level 28 in which the suction inlet 25 is submerged (see FIG. 3). If the car is cornered "hard", then the oil level shifts, so that the top of the transmission oil is at a level 29 causing the suction inlet 25 not to be immersed in the oil pool and to ingest air. When this happens, the transmission 18 is starved for transmission oil and does not function effectively. While FIGS. 3 and 4 illustrate a transmission oil pan 22', it is to be kept in mind that the same principles apply to a lubricating oil pan 20.

Figure 5:
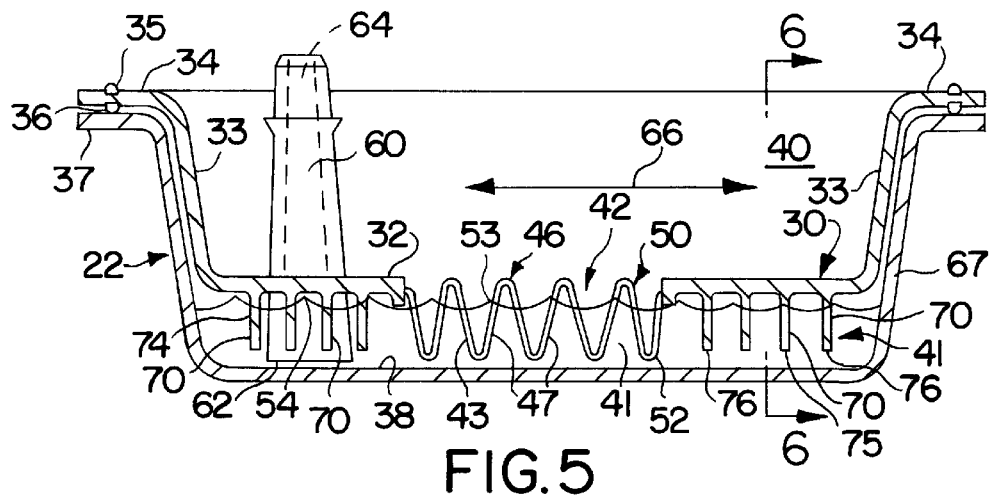
FIG. 5 is a front elevational view of the sump arrangement in accordance with the present invention.
Figure 6:
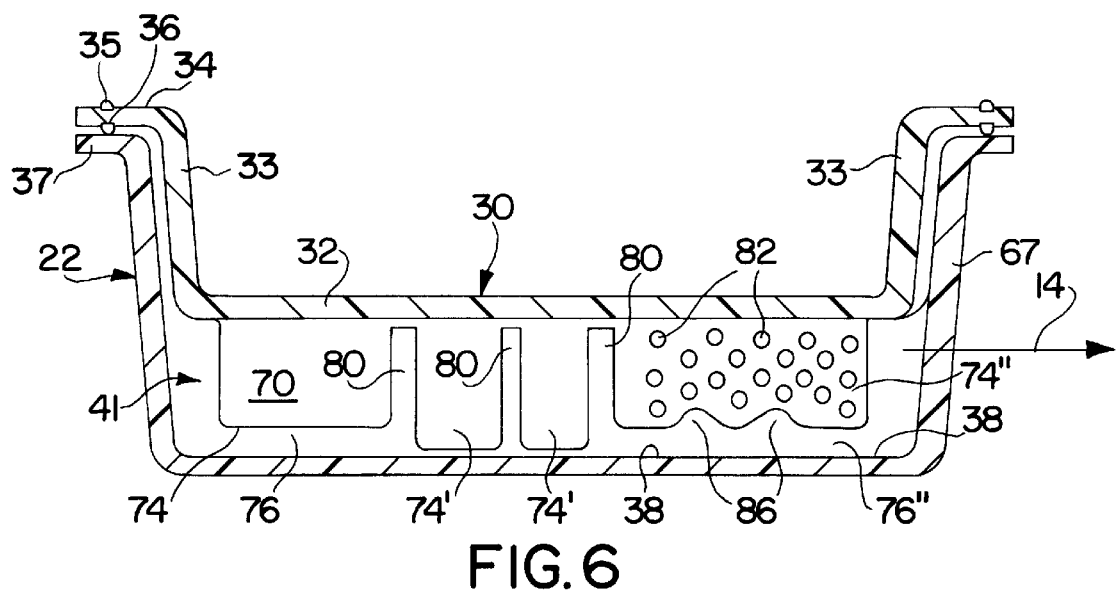
FIG. 6 is a side view showing various configurations that a baffle utilized in the sump of FIG. 5 may assume.

Referring now to FIGS. 5 and 6, it is seen that the transmission oil pan 22 is configured as a sump arrangement 30 in accordance with the principles of the present invention. As is seen on FIG. 5, a separating panel 32 is disposed within the oil pan 22 which is suspended by side walls 33 attached to a peripheral flange 34. The peripheral flange 34 has a first gasket 35 which abuts the drive train housing (not shown) and a second gasket 36 which seals with a peripheral flange 37 of the transmission oil pan 22. In this way, the panel 32 is retained within the transmission oil pan 22 and is suspended above the floor 38 of the transmission oil pan 22 to separate the interior space of the transmission oil pan into an upper chamber 40 and a lower chamber 41.

The panel 32 has an opening 42 therethrough in which is disposed a filter media 43. Preferably, the filter media 43 is a pleated filter media having pleat panels 47 which extend in the direction 14 of vehicle travel, i.e., out of the plane of the paper on which FIG. 5 is illustrated.

In operation, circulating transmission oil is passed from the transmission 18 into the upper chamber 40 where it pools on the dirty side 50 of the pleated filter media 43. The transmission oil then passes through the filter media 43 and emerges on the clean side 52 of the filter media and pools in the lower chamber 41. As the oil is circulated, the oil adjacent the dirty side 50 of the filter media 46 is sucked through the filter media and replenished by continuously circulating oil of the transmission 18.

Disposed through the panel 32 is the suction tube 60. The suction tube 60 has an inlet 62 and an outlet 64. As is clearly seen in FIG. 5, the inlet 62 is below the surface 53 of the oil which pools in the lower chamber 41. Consequently, when the transmission oil pump (not shown) applies suction to the tube 60, the oil is constantly drawn through the suction tube inlet 62 which in turn pulls oil through the filter media 43.

When the vehicle 10 corners hard so that there is substantial centrifugal force applied to the oil pools in the direction of arrow 15, the oil pool tends to shift to the right side of the transmission oil pan 22. In accordance with the present invention, this shift is opposed by baffles 70 which extend perpendicular to the direction of the arrow 66, i.e., in the direction of vehicle travel 14 (see FIG. 6). In addition, the panels 47 of the pleated filter media 43 also provide obstruction to the flow of transmission oil in the direction of arrow 66. Consequently, the inlet opening 62 of the suction pipe 60 remains submerged in the transmission oil.

Baffles 70 may also be positioned parallel to arrow 66 or at some random angle to arrow 66, likewise, the panels 47 of the pleated filter media 43 may be positioned perpendicular to arrow 66 or at same random angle to arrow 66.

Preferably, the baffles 70 are in the form of plates 74 which are in spaced relation to one another and extend perpendicular to the arrow 66 and parallel to the arrow 14. As in seen in FIG. 5, each of the plates 74 has a bottom edge 75 disposed above the floor 38 of the transmission oil pan 22 to provide a gap 76. Consequently, the oil can continuously flow beneath the plates 74 to the inlet opening 62 in suction pipe 60.

Referring now mainly to FIG. 6, there are illustrated a number of arrangement for the baffle plates 74. In a first arrangement, the baffle plates 74 are separated from the floor 38 by gaps 76. In the next arrangement, the baffle plates 74' extend all the way to the floor 38 and there are vertical slots 80 formed in the baffle plate 74' to allow the transmission oil to flow to the inlet 62 of the suction tube 60. In a third arrangement, the baffle plate is configured as a baffle plate 74" wherein a plurality of holes 82 through the baffle plate allow transmission oil to flow to suction tube inlet 62. In addition, the baffle plate 74" has a gap 76" with the floor 38 which gap is periodically increased by indentations 86.

It is to be kept in mind that the baffling arrangement of FIG. 6 is illustrative of a number of configurations that a single baffle plate may have more of a baffle plate having only one feature. In other words, the single baffle plate may extend all the way across the oil pan with a gap 76 between the baffle plate and floor 38, or the baffle plate may have vertical slots 80, or the baffle plate may have holes 82 either in combination with a gap 76" and/or cutouts 86, or the holes 82 may be the only flow-permitting paths. Moreover, each of these flow enabling concepts may be used in a single baffle plate 74.

Again, while FIGS. 5 an 6 are directed primarily to a transmission oil pan 22, the same principles apply to a lubricating oil pan 20 wherein the standard spin-on type oil filter is replaced by the pleated filter media, such as the filter media 46 and a suction tube 60 is used to return filtered lubricating oil to the engine. Again, the baffle plates 74 prevent momentary oil starvation, this time to the engine 12.

From the foregoing description, one skilled in the art can easily ascertain the essential characteristics of this invention, and without departing from the spirit and scope thereof, can make various changes and modification of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not imitative of the remainder of the disclosure in any way whatsoever.

What is claimed is:

1. A sump arrangement for liquids circulated in a drive train of a vehicle, comprising a sump pan having side walls and a horizontally extending floor, the sump pan including a fluid suction tube for returning liquid pooled on the floor to the drive train;

a panel disposed in the sump pan in spaced relation to the floor to divide the sump pan into a first chamber and a second chamber, the panel having an opening therethrough connecting the two chambers and the panel extending transverse to the direction of vehicle travel;

a filter media disposed in the opening, through which filter media the liquid flows for pooling in the second chamber to be returned to the drive train by the suction tube; and a plurality of baffles in the second chamber, the baffles extending in a direction parallel, perpendicular or at an angle to the direction of vehicle travel, which direction of extent prevents rapid movement of the liquid toward the sides of the sump pan whereby the suction tube always has a sufficient supply of liquid to continuously pump liquid to the drive train.

2. The sump arrangement of claim 1 wherein there are passages associated with each baffle for allowing the liquid past the baffle at a flow rate substantially less than the flow rate would be in the absence of the baffle.

3. The sump arrangement of claim 2 wherein the baffles are panels.

4. The sump arrangement of claim 3 wherein the panels are spaced from one another in lateral directions and extend parallel with respect to the direction of vehicular travel.

5. The sump arrangement of claim 4 wherein the baffles are spaced from the floor of the sump to provide a gap through which the liquid flows past the baffles.

6. The sump arrangement of claim 4 wherein there are openings through the panels which allow the liquid to flow past the baffles.

7. The sump arrangement of claim 6 wherein the opening are slots.

8. The sump arrangement of claim 7 wherein the slots are vertical and extend up from the floor.

9. The sump arrangement of claim 3 wherein the openings are discrete holes through the panels.

10. The sump arrangement of claim 4 wherein the drive train includes an automatic transmission; wherein the liquid is transmission oil, and wherein the liquid suction tube is connected to a liquid pump for circulating filtered transmission oil to the automatic transmission.

11. The sump arrangement of claim 4 wherein the drive train includes an engine; wherein the liquid is lubricating oil, and wherein the suction tube is connected to a lubricating oil pump for the engine for returning filtered lubricating oil to the engine.

12. The sump arrangement of claim 4 wherein the filter media is pleated with the pleats extending parallel to the baffles and perpendicular to the direction of vehicle travel to obstruct shifting liquid within the second chamber of the sump.

13. The sump arrangement of claim 1 wherein the filter media is pleated with pleats extending parallel to the baffles and perpendicular to the direction of vehicle travel to obstruct shifting of liquid within the second chamber of the sump.

14. The sump arrangement of claim 1 wherein the drive train includes an automatic transmission; wherein the liquid is transmission oil, and wherein the liquid suction tube is connected to liquid pump for circulating filtered transmission oil to the automatic transmission.

15. The sump arrangement of claim 1 wherein the drive train includes an engine; wherein the liquid is lubricating oil, and wherein the suction tube is connected to a lubricating oil pump for the engine for returning filtered lubricating oil to the engine.

* * * * *